(12) United States Patent
Moriyama

(10) Patent No.: US 6,704,270 B2
(45) Date of Patent: Mar. 9, 2004

(54) DISK RECORDING OR PLAYBACK DEVICE HAVING MECHANISM FOR ADJUSTING TILT OF PICKUP

(75) Inventor: Masahiro Moriyama, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 132 days.

(21) Appl. No.: 09/805,938

(22) Filed: Mar. 15, 2001

(65) Prior Publication Data

US 2001/0022772 A1 Sep. 20, 2001

(30) Foreign Application Priority Data

Mar. 17, 2000 (JP) ........................................ 2000-075665
Apr. 28, 2000 (JP) ........................................ 2000-128750

(51) Int. Cl.$^7$ ............................................. G11B 21/16
(52) U.S. Cl. ....................................................... 369/249
(58) Field of Search ................................ 369/215, 219, 369/249, 258

(56) References Cited

U.S. PATENT DOCUMENTS 5,633,850 A * 5/1997 Park .......................... 369/77.1
5,982,735 A * 11/1999 Tsai ............................. 369/219
5,995,479 A * 11/1999 Takizawa et al. ........... 369/219
6,005,836 A * 12/1999 Choi ........................... 369/219
6,014,362 A * 1/2000 Park ........................... 369/258
6,351,444 B1 * 2/2002 Sogawa et al. ............. 369/219
6,385,160 B1 * 5/2002 Jeon ............................ 369/219

FOREIGN PATENT DOCUMENTS

EP 341936 A2 * 11/1989 ............ G11B/7/08

* cited by examiner

*Primary Examiner*—George J. Letscher
*Assistant Examiner*—Mark S Blouin
(74) *Attorney, Agent, or Firm*—Armstrong, Kratz, Quintos, Hanson & Brooks, LLP

(57) ABSTRACT

An adjusting mechanism for altering the tilting angle of a guide rod in a plane containing the direction of movement of a pickup and orthogonal to an upper surface of a chassis has a horizontal piece having one end attached to the chassis and the other end in contact with the guide rod for biasing the guide rod toward an adjusting screw, and a vertical piece for restraining the guide rod from deflecting in a plane containing the direction of movement of the pickup and approximately parallel to the upper surface of the chassis. The horizontal piece and the vertical piece each have an upper end positioned at a lower level than the lower surface of a tray having a disk placed on a turntable.

3 Claims, 5 Drawing Sheets

US 6,704,270 B2

DISK RECORDING OR PLAYBACK DEVICE HAVING MECHANISM FOR ADJUSTING TILT OF PICKUP

FIELD OF THE INVENTION

The present invention relates to disk recording or playback devices having a mechanism for adjusting the tilt of the pickup with respect to the signal bearing surface of the disk.

BACKGROUND OF THE INVENTION

FIG. 5 is a perspective view of a conventional disk recording or playback device. A chassis 1 has mounted thereon a turntable 3 for placing a disk 7 thereon as is already known, and a pickup 2 movable toward or away from the turntable 3. The pickup 2 is provided with an objective lens 22 on its upper side and guided for movement by two guide rods 4, 4 on the chassis 1. Each guide rod 4 has its opposite ends fitted in respective brackets 9 on the chassis 1.

FIG. 8 is a rear view of the disk 7. The disk 7 has formed in its signal bearing surface a plurality of pits 73, 73 arranged circumferentially thereof. The reflected beam differs in intensity when a laser beam is projected on the pit 73 and when it is projected on a portion other than the pit 73, whereby a digital signal comprising 0 and 1 is reproduced.

In recent years, DVDs (digital versatile disks) are proposed which have signals recorded thereon at a high density. The proposed disk has a reduced spacing H between the pits 73, 73 radially of the disk as shown in FIG. 8.

Accordingly, if the optical axis of the laser beam is slightly inclined with respect to the signal bearing surface of the disk 7, the beam is likely to impinge on the pit 73 at an incorrect position, failing to reproduce the signal correctly.

It has therefore been proposed to provide a mechanism on the chassis 1 for adjusting the tilt of the pickup 2 and to finely adjust the tilt of the pickup 2 for smooth playback of the DVD in the process for fabricating the disk recording or playback device.

FIG. 6 is a view in section taken along the line A—A in FIG. 5. The disk 7 is transported as placed on a tray 5 onto the chassis 1. The tray 5 is moved horizontally by a drive mechanism (not shown) from outside the chassis 1 to above the chassis 1 and then lowered to place the disk 7 on the turntable 3.

Two adjusting screws 6, 6 extend upward through the chassis 1 in screw-thread engagement therewith respectively for opposite ends of the guide rod 4 to support these ends of the guide rod 4 from below with the upper ends of the adjusting screws 6. A compression spring 90 is provided within each bracket 9 for biasing the guide rod 4 downward. The compression springs 90 and the adjusting screws 6 constitute a mechanism for tilting the pickup 2 in a plane containing the direction of movement of the pickup 2 and orthogonal to the upper surface of the chassis 1.

To tilt the pickup 2, one of the adjusting screws 6 is rotated. This lifts the guide rod 4 against the compression spring 90 for tilting. Since the guide rod 4 is tilted, the pickup 2 is also tilted.

FIG. 7 is a plan view of the tray 5. A large disk having a diameter of 12 cm or a small disk having a diameter of 8 cm is selectively placed onto the tray 5. Concentrically formed in the tray 5 are a large recessed portion 51 for the large disk to fit in, and a small recessed portion 52 for the small disk to fit in. The tray 5 has an opening 50 extending from an end portion thereof to both the central portions of the large recessed portion 51 and the small recessed portion 52. The beam of the pickup 2 is projected on the disk 7 through the opening 50.

However, the conventional adjusting mechanism has the following problem.

With the conventional adjusting mechanism, the compression spring 90 biases the guide rod 4 downward and therefore increases the height of the bracket 9 by an amount corresponding to the height of the spring 90, with the result that the upper end of the bracket 9 is positioned at a higher level than the upper surface of the pickup 2. Accordingly, the bracket 9 needs to be positioned within the opening 50 of the tray 5 as lowered, and the opening 50 of the tray 5 must be made great.

However, if the opening 50 of the tray 5 is great, the small disk is likely to slip off the tray 5 when placed into the small recessed portion 52 as positioned partly in the large recessed portion 51 in error. In the absence of the tilt adjusting mechanism, the mechanism need not be positioned in the opening 50, which therefore can be smaller. The tilt adjusting mechanism is nevertheless indispensable to the reproduction of signals as recorded on the disk at a high density as previously stated.

An object of the present invention is to provide a disk recording or playback device which has a mechanism of reduced height for adjusting the tilt of the pickup and wherein the small disk is prevented from slipping off the tray.

SUMMARY OF THE INVENTION

According to the invention, an adjusting mechanism for altering the tilting angle of a guide rod 4 in a plane containing the direction of movement of a pickup 2 and orthogonal to an upper surface of the chassis 1 comprises a spring member having one end attached to the chassis 1 and the other end in contact with the guide rod 4 for biasing the guide rod 4 toward an adjusting member, and means for restraining the guide rod 4 from deflecting in a plane containing the direction of movement of the pickup 2 and approximately parallel to the upper surface of the chassis 1.

The spring member and the restraining means each have an upper end positioned at a lower level than the lower surface of a tray 5 having a disk 7 as placed on the turntable 3.

Thus, the adjusting mechanism is positioned below the tray 5 when the disk 7 is placed on the turntable 3. Since the adjusting mechanism need not be disposed within an opening 50 of the tray 5, the opening 50 can be made smaller. This obviates the likelihood that a small disk will slip off the tray 5.

Further because the height from the chassis 1 to the tray 5 can be diminished, a device of reduced overall thickness is available.

DESCRIPTION OF THE PREFERRED EMBODIMENTS

First Embodiment

An embodiment of the invention will be described below in detail with reference to the drawings concerned.

Figure 1:
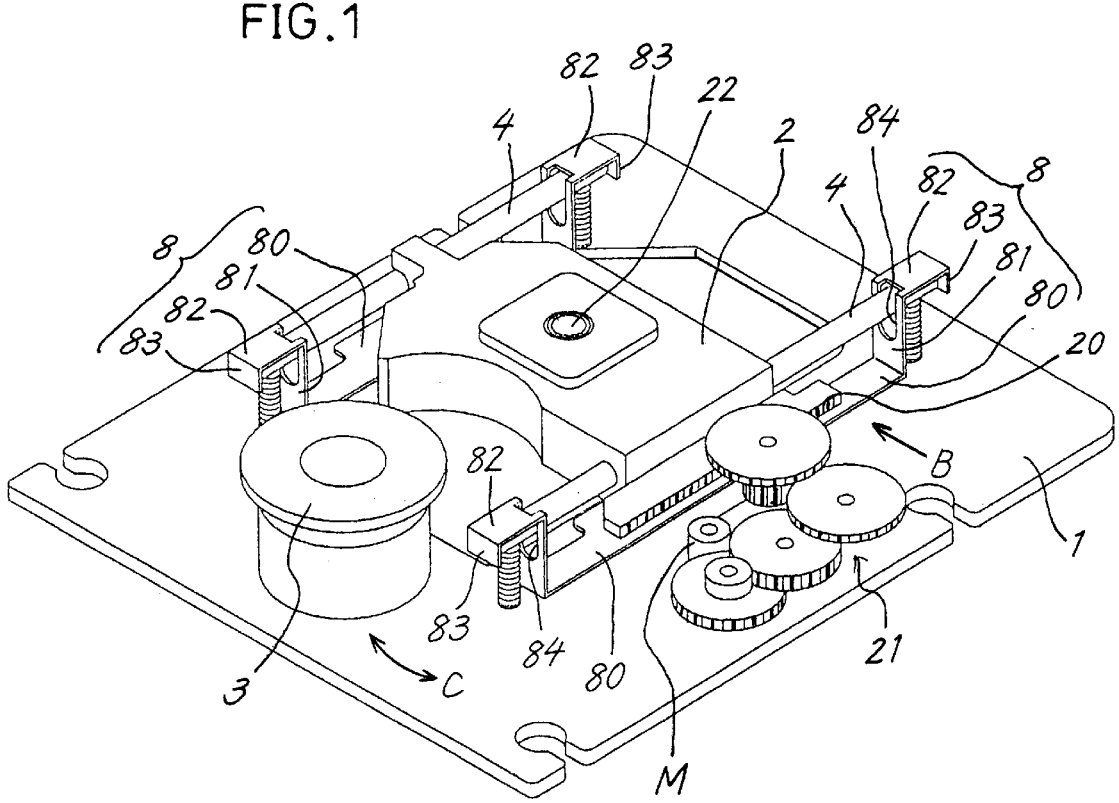
FIG. 1 is a perspective view of a disk recording or playback device.

FIG. 1 is a perspective view of a disk recording or playback device embodying the present invention. The device is characterized by a mechanism for adjusting the tilt of a pickup 2. The device has the same construction as the conventional one in that the pickup 2 is movable toward or away from a turntable 3 by being guided by guide rods 4.

Mounted on a side portion of the chassis 1 is a motor M, which is coupled by a gear mechanism 21 to a rack 20 disposed at one side of the pickup 2. When energized, the motor M rotates the gears of the gear mechanism 21 to move the pickup 2. As in the prior art, a disk 7 is placed on a tray 5 and transported to the chassis 1.

Figure 2:
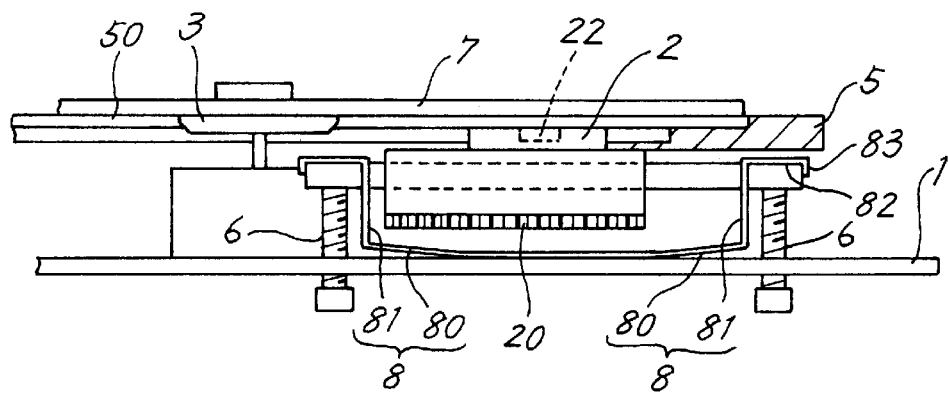
FIG. 2 is a side elevation showing the device as it is seen from the direction B indicated in FIG. 1, with a tray shown partly in section.

FIG. 2 is a side elevation of FIG. 1 as the device is seen from the direction B to show the tray 5 in section. The tray 5 is lowered, with the disk 7 placed on the turntable 3. The lower surface of the tray 5 is away from the guide rods 4, which will not interfere with the descent of the tray 5. Adjusting screws 6 extend through the chassis 1 from below in screw-thread engagement therewith and have upper ends in contact with each guide rod 4.

A pressing piece 8 made by bending a metal strip is disposed on the chassis 1 below each guide rod 4. The pressing piece 8 constitutes the mechanism for adjusting the tilt of the pickup 2. The pressing piece 8 comprises portions which are integral, i.e., an elastic portion 80 attached to the chassis 1, a vertical portion 81 extending upright from each end of the elastic portion 80, a horizontal portion 82 extending outward from the upper end of the vertical portion 81 along the guide rod 4, and a retaining portion 83 bent downward from the outer end of the horizontal portion 81.

The horizontal portion 82 is in contact with the upper surface of the guide rod 4, pressing the guide rod 4 downward, namely, toward the adjusting screw 6, by being biased by the elastic portion 80. The vertical portion 81 has a vertical aperture 84 with the guide rod 4 fitted therein. The guide rod 4 is in contact with opposite side edges of the apertured portion 84, whereby the guide rod 4 is restrained from deflecting in a plane containing the direction of movement of the pickup 2 and approximately parallel to the upper surface of the chassis 1, i.e., from moving in the directions of the double arrow C in FIG. 1. The retaining portion 83 is in contact with the corresponding end of the guide rod 4 to restrain the guide rod 4 from moving axially thereof.

When the adjusting screw 6 is rotated against the biasing force of the horizontal portion 83, the corresponding end of the guide rod 4 is raised to tilt the guide rod 4, also tilting the pickup 2 to be guided by the guide rod 4.

As shown in FIG. 2, the horizontal portions 82 which are at the highest level among the other component portions of the pressing piece 8 are in contact with the guide rod 4 and are at a lower level than the lower surface of the tray 5. Accordingly, the pressing piece 8 will not interfere with the tray 5 when the tray 5 descends to place the disk 7 on the turntable 3.

This eliminates the need to position the tilt adjusting mechanism within the opening 50 of the tray 5 as conventionally required, whereby the opening 50 can be made smaller to obviate the likelihood that the small disk will slip off the tray 5. Furthermore, the tilt adjusting mechanism can be made simple in construction since the pressing piece 8 biases the guide rod 4 downward and prevents the guide rod 4 from deflectively moving in plane containing the direction of movement of the pickup 2 and approximately parallel to the upper surface of the chassis 1.

Figure 3:
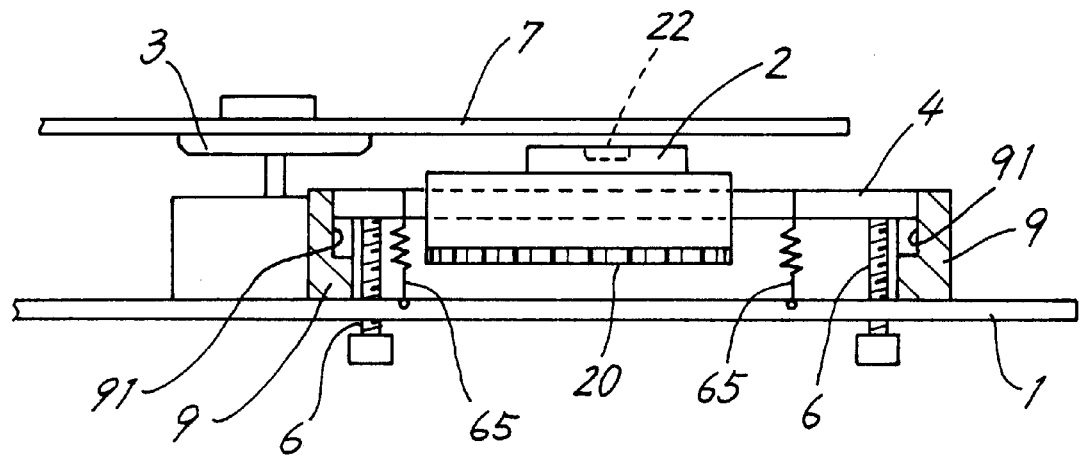
FIG. 3 is a side elevation showing another tilt adjusting mechanism.

FIG. 3 shows an arrangement alternatively usable in place of the pressing member 8 shown in FIG. 2 for biasing the guide rod 4 downward. The illustrated arrangement includes tension springs 65, 65 each having one end attached to the chassis 1 and the other end attached to the guide rod 4 for biasing the guide rod 4 toward an adjusting screw 6. Brackets 9, 9 are provided for the respective opposite ends of the guide rod 4. Each rod end is fitted in a vertical cavity 91 formed in a side wall of the bracket 9. The guide rod 4 fitted in the vertical cavities 91 is restrained from deflecting in a plane containing the direction of movement of the pickup 2 and approximately parallel to the upper surface of the chassis 1.

Figure 4:
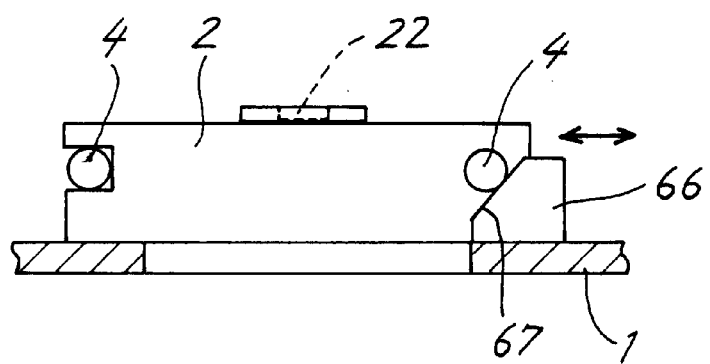
FIG. 4 is a side elevation showing another tilt adjusting mechanism.
Figure 5:
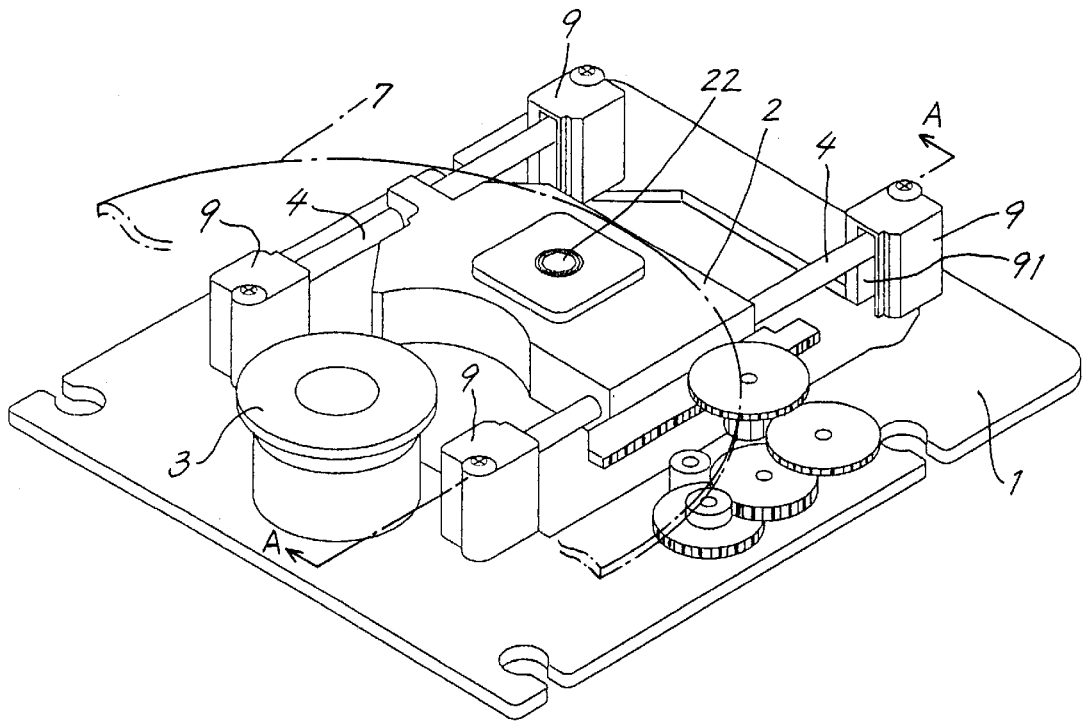
FIG. 5 is a perspective view of a conventional disk recording or playback device.
Figure 6:
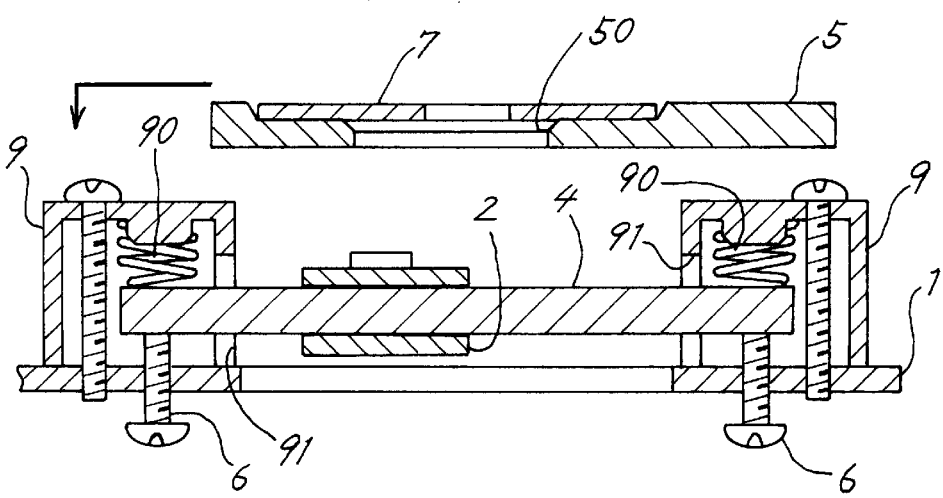
FIG. 6 is a view in section taken along the line A—A in FIG. 5.
Figure 7:
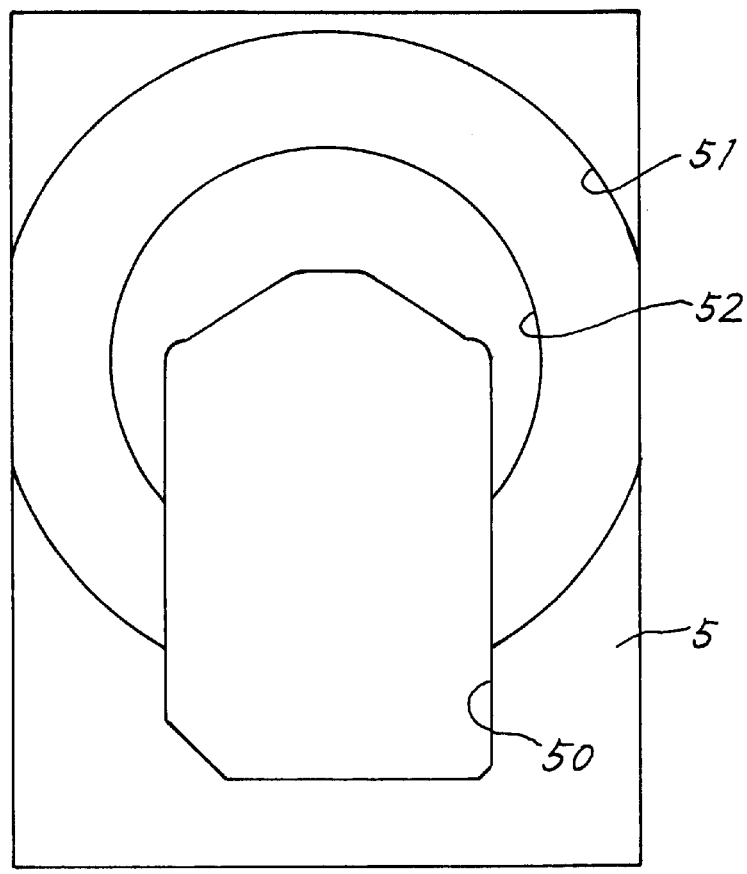
FIG. 7 is a plan view of a tray.
Figure 8:
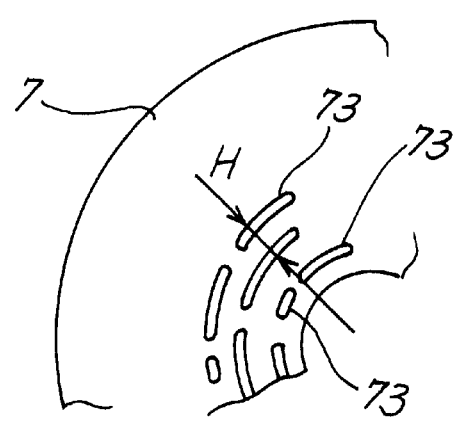
FIG. 8 is rear view of a disk.

Although the tilt of the guide rod 4 is made adjustable by rotating the adjusting screw 6, alternatively usable is a cam piece 66 movably mounted on the chassis 1 as shown in FIG. 4. FIG. 4 is a front view showing the pickup 2 as seen from the location of the turntable 3. The cam piece 66 is provided with a slope 67 in contact with the guide rod 4. The cam piece 66 is moved along the chassis 1 in a plane orthogonal to the direction of movement of the pickup 2, whereby the slope 67 is moved toward or away from the guide rod 4 to tilt the pickup 2.

It appears useful to adjust the tilt of the guide rods 4, 4, for example, while recognizing the error rate of reproduced signals. Stated more specifically, the tilt of the guide rod 4 is adjusted by turning the adjusting screw 6 while playing back a disk having reference signals recorded thereon and checking the error rate of the reproduced signals, i.e., the ratio of the bit rows reproduced incorrectly to the bit rows of the reference signals. The adjustment is terminated when the most satisfactory error rate is available. Alternatively, the tilt may be adjusted so as to ensure minimized jitter of signals reproduced by playing back the disk having reference signals recorded thereon.

Second Embodiment

The pickups 2 commercially available include those wherein bores (not shown) for inserting guide rods 4, 4a therethrough for mounting the pickup on a chassis 1 are made different from each other in level. The present applicant has conceived of an idea of reducing the height of the tilt adjusting mechanism for use in devices incorporating such an inexpensive pickup 2.

Figure 9:
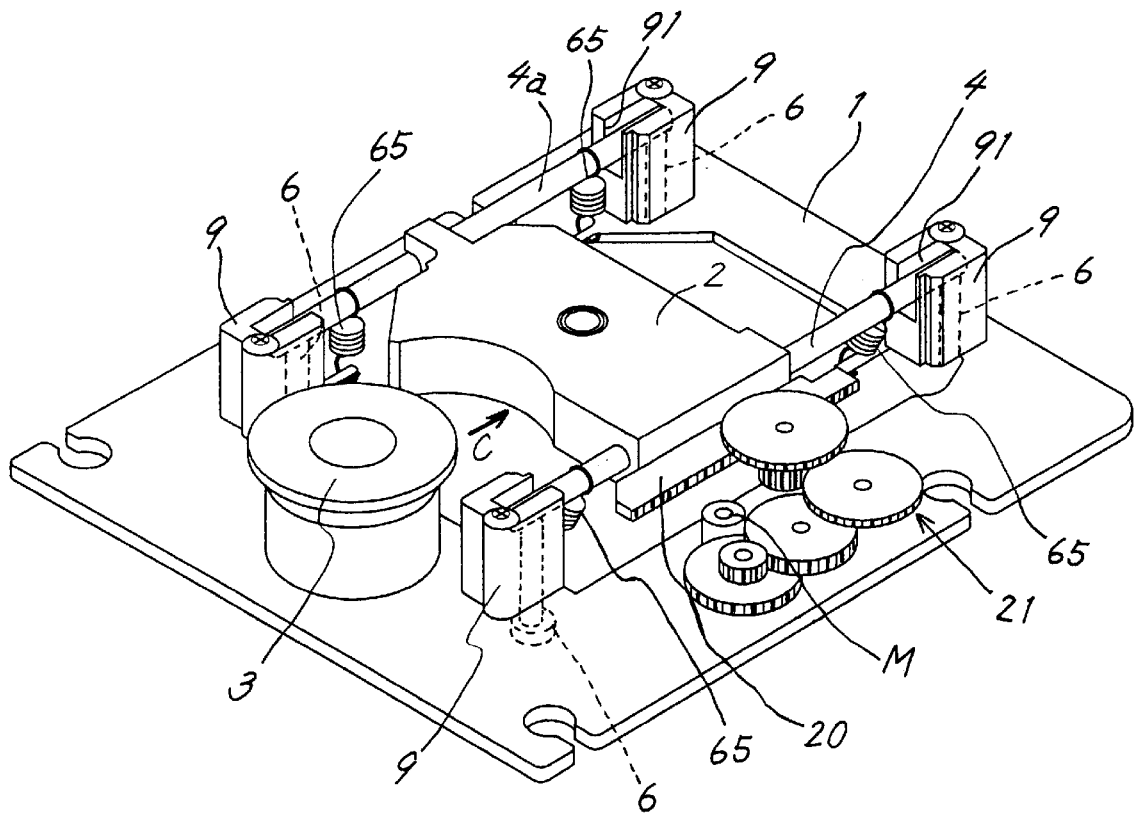
FIG. 9 is a perspective view of another disk recording or playback device.

FIG. 9 is a perspective view of another disk recording or playback device, wherein two guide rods 4, 4a are biased downward by tension springs 65, 65. Like the arrangement shown in FIG. 3, the adjusting mechanism for altering the tilting angle of the guide rod 4 is given a reduced height. The pickup 2 is fitted to the right guide rod 4 with diminished leeway given and is movable along the guide rod 4. The pickup 2 is fitted to the left guide rod 4a with leeway provided.

Mounted on the chassis 1 are brackets 9, 9 for the respective ends of each of the guide rods 4, 4a. Each of the guide rods 4, 4a is supported at its lower surface by upper ends of adjusting screws 6, 6 each positioned within the bracket 9 and inserted through the chassis 1 from below. The guide rod 4 (4a) is biased downward into pressing contact with the adjusting screws 6, 6 by the tension springs 65, 65 each attached at one end thereof to the chassis 1.

The present embodiment is characterized in that although the guide rods 4, 4a are different in level, the tensile springs 65, 65, which are the same, are used for biasing the guide rods 4, 4a.

Figure 10:
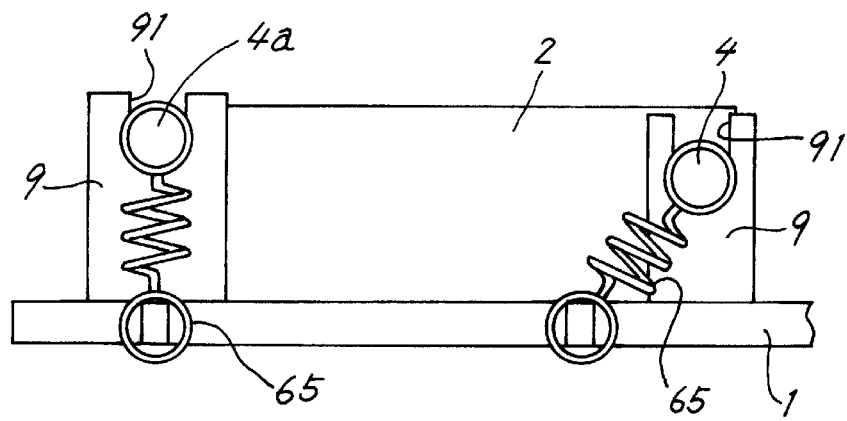
FIG. 10 is a front view of FIG. 9 as it is seen from the direction C indicated in FIG. 9.

FIG. 10 is a front view of the pickup as it is seen from the direction C indicated in FIG. 9. The guide rod 4 at the right is positioned at a lower level than the guide rod 4a at the left in conformity with the shape of the pickup 2. The guide rods 4, 4a are fitted in vertical cavities 91 in the brackets 9. The tension springs 65 for the right guide rod 4 are disposed on the chassis 1 obliquely, while the tension springs 65 for the left guide rod 4a are disposed vertically on the chassis 1. The tension springs 65 attached to the guide rod 4 at the lower level are attached obliquely to the chassis 1, whereby the springs 65 for the two rods 4, 4a are made to have the same length under tension.

Since the tension springs 65 for the right guide rod 4 are attached to the chassis 1 as positioned obliquely relative thereto, the rod 4 is pressed into contact with a side edge and the bottom face of each vertical caved portion 91. Consequently, each tension spring 65 biases the guide rod 4 downward and restrains the guide rod 4 from deflectively moving in a plane containing the direction of movement of the pickup 2 and approximately parallel to the upper surface of the chassis 1. The pickup 2 is guided by the right guide rod 4 for movement, so that the direction of movement of the pickup 2 can be determined accurately by positioning the guide rod 4 in place within the plane containing the direction of movement of the pickup 2 and approximately parallel to the upper surface of the chassis 1.

Since the two tension springs 65, 65 have the same length under tension, the springs 65, 65 can be the same and can therefore be installed in place with an improved work efficiency in the process for fabricating the device.

The adjusting screws 6, 6 may be replaced by the cam piece 66 on the chassis 1 as shown in FIG. 4 also in the case of the present embodiment.

What is claimed is:

1. A disk recording or playback device having a tray for placing a disk thereon and transporting the disk to a chassis, the device comprising as mounted on the chassis a turntable for rotating the disk, a pickup movable toward or away from the turntable, a guide rod for guiding the movement of the pickup, and an adjusting mechanism for altering the tilting angle of the guide rod in a plane containing the direction of movement of the pickup and orthogonal to an upper surface of the chassis, the adjusting mechanism having an adjusting member attached to the chassis from below the chassis or laterally with respect thereto and in contact with the guide rod, the disk recording or playback device being characterized in that:

the adjusting mechanism has a pressing member which comprises a resilient spring member and resilient means integral with the spring member for restraining the guide rod, the spring member extending in a direction substantially parallel to the guide rod and having a first portion engaging the chassis and a second portion integrally formed with the first portion and engaging the guide rod for biasing the guide rod toward the adjusting member, and the means for restraining the guide rod being operative for restraining the guide rod from deflecting in a plane containing the direction of movement of the pickup and approximately parallel to the upper surface of the chassis, the spring member and the restraining means each having an upper end positioned at a lower level than a lower surface of the tray having the disk placed on the turntable.

2. A disk recording or playback device according to claim 1 wherein the adjusting member is an adjusting screw extending through the chassis from below the chassis in screw-thread engagement therewith, or a cam piece movable laterally of the chassis in a space between the chassis and the guide rod.

3. A disk recording or playback device comprising as mounted on a chassis a turntable for rotating a disk, a pickup movable toward or away from the turntable, a pair of guide rods extending along the direction of movement of the pickup for guiding the pickup, and an adjusting mechanism for altering the tilting angle of each of the guide rods in a plane containing the direction of movement of the pickup and orthogonal to an upper surface of the chassis, the adjusting mechanism having an adjusting member attached to the chassis from below the chassis or laterally thereof and in contact with the guide rod, the disk recording or playback device being characterized in that:

the pickup is mounted on the guide rod with diminished leeway, the guide rod being positioned at a lower level than the other guide rod, the adjusting mechanism comprising a tension spring having one end attached to the chassis for biasing the guide rod toward the adjusting member, and means for restraining the guide rod from deflecting in a plane containing the direction of movement of the pickup and approximately parallel to the upper surface of the chassis, the tension spring for biasing the lower guide rod being attached to the chassis obliquely to press the guide rod against the adjusting member and the restraining means, the tension springs for biasing the respective guide rods having the same length under tension.

* * * * *